United States Patent [19]
Morgan et al.

[11] Patent Number: 5,218,779
[45] Date of Patent: Jun. 15, 1993

[54] FISHING LINE TRANSFER DEVICE

[76] Inventors: Robert G. Morgan, 6621 Gundry Ave., Long Beach, Calif. 90805; Eugene V. Capatina, 26692 Stafford Mission, Viejo, Calif. 92692

[21] Appl. No.: 881,350

[22] Filed: May 11, 1992

[51] Int. Cl.⁵ ............................................. A01K 87/00
[52] U.S. Cl. ...................................... 43/25; 242/106
[58] Field of Search ............ 43/4, 25; 242/106, 129.51

[56] References Cited

U.S. PATENT DOCUMENTS

| | | | |
|---|---|---|---|
| 2,848,778 | 8/1958 | Plummer, Sr. et al. | 43/25 |
| 3,629,966 | 12/1971 | Sanchez | 43/25 |
| 3,685,761 | 8/1972 | Zelinski | 242/106 |
| 3,951,354 | 4/1976 | Bagby | 242/106 |
| 4,151,966 | 5/1979 | Lindsay | 242/106 |
| 4,948,064 | 8/1990 | Richard | 242/106 |

Primary Examiner—Richard K. Seidel
Assistant Examiner—Chuck Y. Mah

[57] ABSTRACT

An apparatus which clasps easily to a fishing rod for the purpose of retaining a fishing line spool to aid in the transfer of fishing line from spool to fishing reel or from fishing reel to fishing line spool. Apparatus retains the fishing line spool to the spool holder base with the use of a conic retention nut thereby both the casting and spinning reel configuration may utilize the apparatus without altering reeling methods.

4 Claims, 3 Drawing Sheets

FISHING LINE TRANSFER DEVICE

References Cited: U.S. Pat. Nos.

| | | | |
|---|---|---|---|
| 3,302,320 | 3,399,847 | 3,402,501 | 3,647,155 |
| 3,776,485 | 3,799,471 | 3,950,881 | 3,957,224 |
| 3,973,741 | 4,715,554 | 4,728,048 | 4,739,946 |
| 4,776,527 | 4,787,168 | 4,922,644 | 5,029,409 |

FIELD OF INVENTION

Having purchased a spool of fishing line, every fishing person has devised a method to transfer the fishing line from the fishing line spool to a fishing reel. Methods entail tossing the spool then reeling in the slack fishing line, clamping a proper sized bolt into a vise and placing the fishing line spool bore over the bolt and then reeling the fishing line onto the fishing reel, and the classic is probably the two person method of inserting a pencil into the bore of the fishing line spool and while one person holds onto the ends of the pencil the other person reels fishing line onto the fishing reel.

These methods, although they accomplish the task of line transfer, are not without the intrinsic problems of tangled fishing line, fishing line coming off the end of the spool thus twisting the line, and fishing line wrapped around the respective holding device.

Prior art in the references cited reveals that attempts have been made to address these mentioned problems resulting in some cases with elaborate solutions and in some cases over simplified methods. What the prior inventions fail to provide is a single device that embodies the attributes necessary to be an acceptable solution that will receive all fishing line spool sizes, provide a means to adjust the tension of the fishing line, may be attached to any fishing pole in any orientation without having the fishing line spool fall off, enables the line to be spooled off with the spool turning about a center point in either a clockwise or counter clockwise direction eliminating twist, is convenient to use, can be used to remove fishing line from a fishing reel, and is cost effective. Therefore, these inventors suggests that each cited reference does lack in one or more of the general attributes to provide a satisfactory solution of the above mentioned fishing line spooling problems.

SUMMARY OF THE INVENTION

The present invention is to provide a means to transfer fishing line onto a fishing reel from a fishing line storage spool or to provide a means to remove fishing line from a fishing reel onto a receiving fishing line storage spool. Using the designated retention clasp, the spool holder base is clasped to the fishing rod on the same side as the line guides of the fishing pole when transferring line onto the respective fishing reel. A threaded extender shaft is threaded into the respective threaded hole of the spool holder base. Any additional threaded extender shafts may be added to extend the length of the shaft. The fishing line spool bore is placed over the threaded extender shaft and is then held in place by the conic threaded nut which can be tightened to the desired tightness to provide tension on the fishing line spool while the fishing line spool is rotating during the line transfer process the lock nut is threaded on next and tightened up against the conic nut.

When employed to remove line from the respective fishing reel, the spool holder base is clasped in a ninety degree orientation with respect to the fishing pole line guides and employing the attachment of the accessory crank assembly comprised of the threaded crank and like threaded extruded channel to the fishing line spool, the fishing line spool is turned thus removing the fishing line from the fishing reel onto the fishing line spool.

DETAILED DESCRIPTION OF THE INVENTION

Figure 1A:
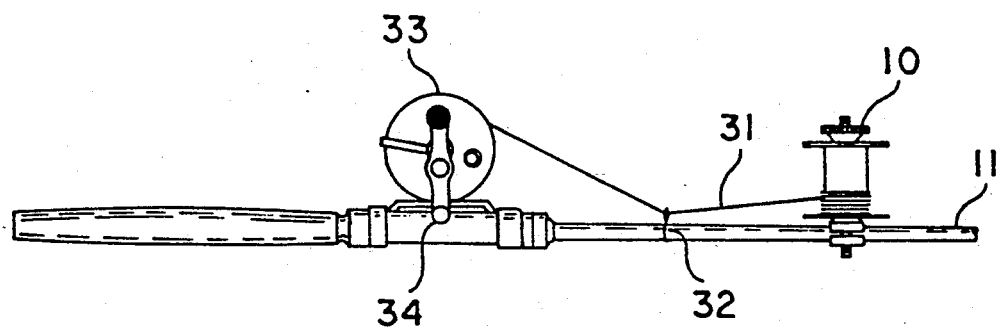
FIGS. 1A & 1B are side views showing the invention in the configuration in which it is employed for the various reel types.
Figure 1B:
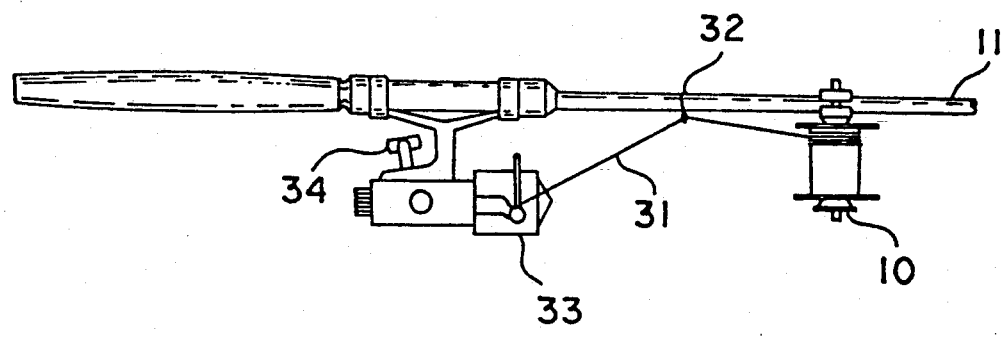
Figure 2A:
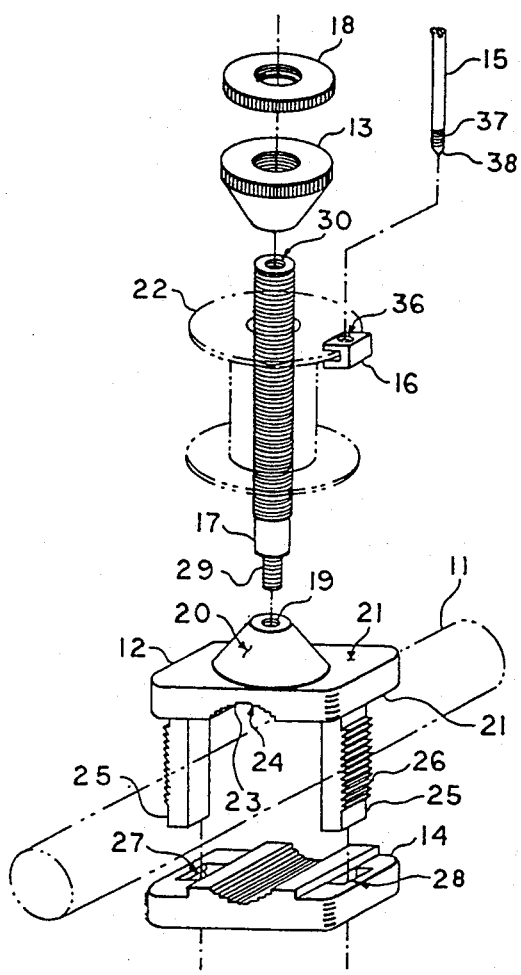
FIGS. 2A & 2B are exploded perspective assembly drawings showing each part of primary and alternate configurations the Fishing Spool Tool.
Figure 2B:
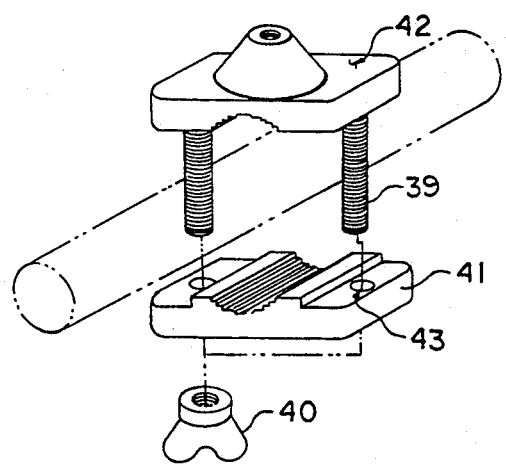
Figure 3:
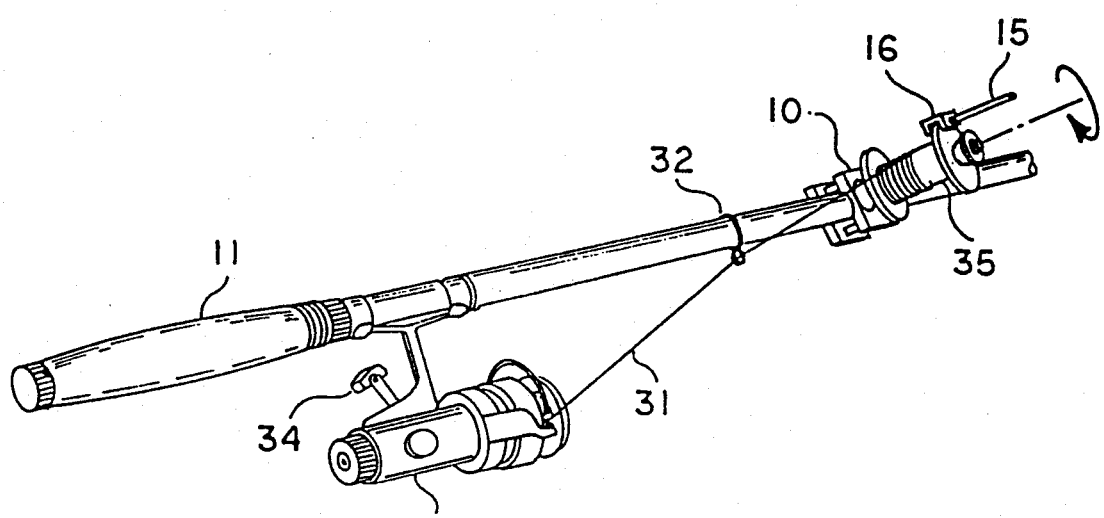
FIG. 3 is a perspective view of the Fishing Spool Tool configured to remove fishing line from a spinning fishing reel/pole assembly.

The present invention made with an injection molding process of a selected plastic is illustrated in FIGS. 1-3 and is identified as Fishing Spool Tool 10. The said Fishing Spool Tool 10 attaches to any conventional casting or spinning fishing pole 11 as shown in FIGS. 1A & 1B. The said Fishing Spool Tool is comprised of the spool holder base 12, a conic retaining nut 13 a retention clasp 14 a threaded crank 15, a spool clamp 16 a threaded extender shaft 17 and a lock nut 18 in the primary configuration, and in the alternate configuration spool holder base 42, retention clasp 41 and two each wing nuts 40 are substituted for the said retention clasp 14 and said spool holder base 12 of the primary configuration.

As illustrated in FIG. 2A in the primary configuration, the said spool holder base 12 has an integral threaded hole 19 within an integral conic tapered stud 20 which is centered in the anterior field of the integral rectangular base 21. A said threaded extender shaft 17 threads into the said threaded hole 19. A fishing line spool 22 is placed over the said threaded extender shaft 17 and rests on the said conic tapered stud 20 and is retained on said threaded extender shaft 17 with said conic retainer nut 13 and said lock nut 18. The underside posterior plane of said rectangular base 21 has an integral elliptical channel 23 with equally spaced integral triangular channels or semi-cylindrical channels 24 traversing the center of the lesser dimension of the said rectangular base 21. These said triangular or semi-cylindrical channels 24 are utilized in gripping the said fishing pole 11. Two integral rectangular studs 25 equally spaced from the center line of said rectangular base 21 and oriented perpendicular of the said rectangular base 21 in a longitudinal downward orientation have serrated sawtooth exterior surfaces 26 which are used to mate and clasp with the reciprocating serrated exterior surfaces 27 of the integral rectangular cutout channels 28 of the said retention clasp 14 which when engaged with the said spool holder base 12 clasped around a said fishing pole 11 a proper clamping force is realized to hold the said Fishing Spool Tool 10 securely to a said fishing pole 11 in any desired orientation. As illustrated in FIG. 2B, the said spool tool 10 is clamped to said fishing pole 11 using an alternate said spool holder base 42 with an integral circular threaded studs 39, an alternate said retention clasp 41 having integral cylindrical holes 43 bored out and two each said wing nuts 40.

Using the alternate configuration of FIG. 2B, the said spool holder base 42 and said retention clasp 41 are engaged around the said fishing pole 11 using two each said wing nuts 40 threaded onto said threaded circular studs 39. A proper clamping force is realized to hold the said fishing spool tool 10 securely to a said fishing pole 11 in any desired orientation.

In the event a said fishing line spool 22 is greater in height than the height of one said threaded extender shaft 17, additional said threaded extender shafts 17 may be threaded into the end of the previous threaded extender shaft 17 by mating the thread 29 of said threaded extender shaft 17 into the integral threaded hole 30 of said threaded extender shaft 17. The said spool holder base 12 is released from the said fishing pole 11 in the primary configuration of FIG. 2A, by applying inward pressure to the said rectangular studs 25, allowing the said retention clamp 14 to disengage thereby disengaging the said spool holder base 12 from the said fishing pole 11. In the alternate configuration of FIG. 2B, the said spool tool base 42 is released from the said fishing pole 11 by unthreading the said two each wing nuts 40 allowing the said retention clasp 41 to disengage.

Proper use or the said Fishing Spool Tool 10 will entail placing the said Fishing Spool Tool 10 onto a said fishing pole 11 as shown in FIGS. 1A & 1B. A fishing line spool 22 with fishing line 31 will then be placed on the said threaded extender shaft 17 and onto the said spool holder base 12 or 42 threading the said fishing line 31 through the line guide 32 closest to the said fishing reel 33 and held in place with the desired tension by the said conic retaining nut 13 and lock nut 18. The spooling of said fishing line 31 onto said fishing reel 33 may begin with turning the handle 34 of the said fishing reel 33.

The said Fishing Spool Tool 10 is employed in taking fishing line off said fishing reel 33 onto an empty or partially filled receiver fishing line spool 35 as depicted in FIG. 3 by placing said Fishing Spool Tool 10 in a lateral/horizontal attitude in relation to the line guide of said fishing pole 11. Said spool clamp 16 is placed over the outward circumferential edge of said fishing line spool 35 with the threaded hole 36 outward to accept the threaded end 37 of said threaded crank 15. When said threaded crank 15 is threaded into the said spool clamp 16 the point 38 of said threaded crank 15 penetrates said fishing line spool 35 engaging said fishing line spool 35 so that the said auxiliary crank assembly 15 & 16 is securely clasped to said fishing line spool 35 enabling one to turn the said fishing line spool 35 around the center point of said spool holder base 12 or 42 thereby removing line from said fishing reel 33.

Having described the invention the following claims are made:

1. A fishing line transfer device for transferring a spool of fishing line onto a fishing reel and for mounting on a fishing rod, said transfer device comprising:
   a rectangular base and a rectangular clasp for mounting said transfer device on said rod;
   a threaded extender shaft with one end attached to said base for rotatably holding said spool; and
   a conical lock nut and a disc lock nut threadably engaging an opposite end of said extender shaft;
   wherein said base has a top surface and a bottom surface, said top surface having a tapered stud interconnecting said shaft and said base, and said bottom surface having an elliptical channel defined by equally spaced grooves adapted to receive the fishing rod and having two studs extending perpendicular thereto, each of said studs having a serrated surface;
   wherein said clasp has a top surface, said top surface having an elliptical channel defined by equally spaced grooves adapted to receive the fishing rod and having two cutouts extending therethrough, each of said cutouts having a serrated surface and adapted to receive said studs;
   whereby after placing said rod on said clasp, said extending studs are inserted into said cutouts so that their respective serrations mate, thereby clamping said device to said rod; and
   whereby after placing said spool on said shaft, said disc nut is rotated against said conical lock nut, thereby adjusting the tension of the spool.

2. The fishing line transfer device as in claim 1 wherein said device further comprises:
   a crank means adapted to be attached to an outer flange of said spool for removing fishing line from said reel.

3. A fishing line transfer device for transferring a spool of fishing line onto a fishing reel and for mounting on a fishing rod, said transfer device comprising:
   a rectangular base and a rectangular clasp for mounting said transfer device on said rod;
   a threaded extender shaft with one end attached to said base for rotatably holding said spool; and
   a conical lock nut and a disc lock nut threadably engaging an opposite end of said extender shaft;
   wherein said base has a top surface and a bottom surface, said top surface having a tapered stud interconnecting said extender shaft and said base, and said bottom surface having an elliptical channel defined by equally spaced grooves adapted to receive the fishing rod and having two threaded cylindrical shafts extending perpendicular thereto,
   wherein, said clasp has a top surface, said top surface having an elliptical channel defined by equally spaced grooves adapted to receive the fishing rod and having two cutouts extending therethrough, each of said cutouts adapted to receive said threaded cylindrical shafts;
   said device further comprising threaded nuts for clamping said clasp and said base to said fishing rod by tightening said nuts on said threaded cylindrical shafts;
   whereby after placing said rod on said clasp, said threaded cylindrical shafts are inserted into said cutouts and said nuts are tightened, thereby clamping said device to said rod; and
   whereby after placing said spool on said shaft, said disc nut is rotated against said conical lock nut, thereby adjusting the tension of the spool.

4. The fishing line transfer device as in claim 3 wherein said device further comprises:
   a crank means adapted to be attached to an outer flange of said spool for removing fishing line from said reel.

* * * * *